US012698139B2

(12) United States Patent
Yoshida

(10) Patent No.: US 12,698,139 B2
(45) Date of Patent: Aug. 4, 2026

(54) PACKAGED OBJECT AND PACKAGE MEMBER

(71) Applicant: KYOCERA DOCUMENT SOLUTIONS INC., Osaka (JP)

(72) Inventor: Yuichi Yoshida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 19/057,996

(22) Filed: Feb. 20, 2025

(65) Prior Publication Data

US 2025/0263214 A1 Aug. 21, 2025

(30) Foreign Application Priority Data

Feb. 21, 2024 (JP) ................................ 2024-024505

(51) Int. Cl.
*B65D 65/16* (2006.01)
*B65D 85/38* (2006.01)
*G03G 15/00* (2006.01)

(52) U.S. Cl.
CPC ............. *B65D 65/16* (2013.01); *B65D 85/38* (2013.01); *G03G 15/751* (2013.01)

(58) Field of Classification Search
CPC ........ B65D 65/16; B65D 65/00; B65D 65/02; B65D 65/10; B65D 65/22; B65D 65/38; B65D 85/38
USPC .............................................. 206/316.1, 455
See application file for complete search history.

(56) References Cited

U.S. PATENT DOCUMENTS 4,860,898 A * 8/1989 Hiro ........................ G03G 15/75 206/455
5,096,755 A * 3/1992 Nakagawa ............. G03G 15/75 524/495
5,209,352 A * 5/1993 Light ................... B65D 81/025 206/443
5,509,561 A * 4/1996 Kanterovitch ....... G03B 27/588 206/455

(Continued)

FOREIGN PATENT DOCUMENTS

JP H1170975 A * 3/1999
JP 2008009081 A * 1/2008

(Continued)

*Primary Examiner* — Jacob K Ackun
(74) *Attorney, Agent, or Firm* — Li & Cai Intellectual Property Office

(57) ABSTRACT

A packaged object includes an electrophotographic photosensitive member and a protective sheet. The electrophotographic photosensitive member is formed in a cylindrical shape. The protective sheet covers at least a portion of an outer circumferential surface of the electrophotographic photosensitive member so that a center position in an axis line direction is aligned with a center position of the electrophotographic photosensitive member in the axis line direction. Provided that a length of the electrophotographic photosensitive member in the axis line direction is denoted by L1 (mm) and a length of the protective sheet in the axis line direction is denoted by L2 (mm), a relationship expressed by Expression (1) below is established:

$$L2 < L1. \quad (1)$$

5 Claims, 7 Drawing Sheets

(56) References Cited

U.S. PATENT DOCUMENTS

| | | | | | |
|---|---|---|---|---|---|
| 6,004,733 | A * | 12/1999 | Ishii | G03C 3/00 206/397 | |
| 6,048,676 | A * | 4/2000 | De Leener | G03C 3/00 430/501 | |
| 6,789,672 | B2 * | 9/2004 | Takahashi | B65B 25/148 53/409 | |
| 9,708,116 | B2 * | 7/2017 | Koishi | B65D 43/16 | |
| 2002/0117415 | A1 * | 8/2002 | Fukugawa | G03C 3/00 242/118 | |
| 2007/0178262 | A1 * | 8/2007 | McGuire | B29C 59/06 428/173 | |
| 2014/0014711 | A1 * | 1/2014 | Jutras | B65D 65/10 229/87.01 | |
| 2014/0090998 | A1 * | 4/2014 | Kimoto | B65D 5/50 206/391 | |

FOREIGN PATENT DOCUMENTS

| | | | | |
|---|---|---|---|---|
| JP | 201131890 | A | | 2/2011 |
| JP | 2014048509 | A | * | 3/2014 |

* cited by examiner

PACKAGED OBJECT AND PACKAGE MEMBER

CROSS-REFERENCE TO RELATED PATENT APPLICATION

This application claims the benefit of Japanese Priority Patent Application JP 2024-024505 filed Feb. 21, 2024, under 35 U.S.C. 119, the entire contents of which are incorporated herein by reference.

FIELD OF THE DISCLOSURE

The present disclosure relates to a packaged object and a package member.

BACKGROUND OF THE DISCLOSURE

Japanese Patent Application Laid-open No. 2011-031890 has disclosed an electrophotographic photosensitive member that is installed in an electrophotographic image forming apparatus. The electrophotographic photosensitive member having a cylindrical shape is packaged with a rectangular protective sheet. A length of one side of the protective sheet is set to be larger than an outer circumferential length of the electrophotographic photosensitive member and a length of another side of the protective sheet is set to be equal to or larger than an axial length of the electrophotographic photosensitive member.

SUMMARY OF THE DISCLOSURE

In accordance with a first aspect of the present disclosure, a packaged object includes an electrophotographic photosensitive member and a protective sheet. The electrophotographic photosensitive member is formed in a cylindrical shape. The protective sheet covers at least a portion of an outer circumferential surface of the electrophotographic photosensitive member so that a center position in an axis line direction is aligned with a center position of the electrophotographic photosensitive member in the axis line direction. Provided that a length of the electrophotographic photosensitive member in the axis line direction is set to L1 (mm) and a length of the protective sheet in the axis line direction is set to L2 (mm), a relationship expressed by Expression (1) below is established:

$$L2 < L1. \quad (1)$$

In accordance with a second aspect of the present disclosure, a package member includes a plurality of packaged objects and an accommodation container. The plurality of packaged objects is defined in any one of claims 1 to 4. The accommodation container accommodates the plurality of packaged objects so that the plurality of packaged objects is aligned in parallel. The packaged object includes, at an end portion of the packaged object in an axis line direction, a coupling portion capable of being assembled in an image forming apparatus. The accommodation container includes a support portion that supports end portions of the plurality of packaged objects in the axis line direction. The support portion supports the coupling portion or supports an area between an end portion of the electrophotographic photosensitive member in the axis line direction and an end portion of the protective sheet in the axis line direction.

In accordance with the packaged object and the package member according to the present disclosure, damage of the electrophotographic photosensitive member can be suppressed.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, embodiments of the present disclosure will be described with reference to the drawings. Note that in the figures, the same or corresponding portions will be denoted by the same reference signs and the descriptions will not be repeated.

Figure 1:
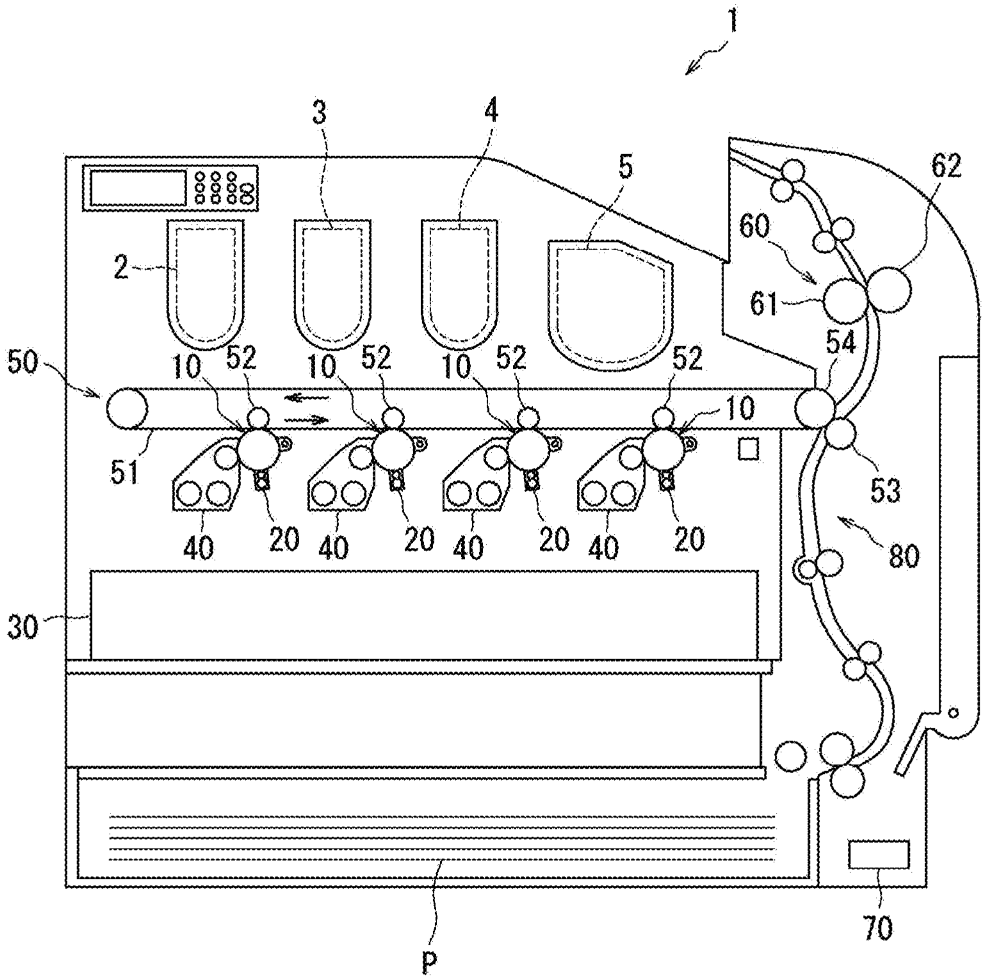
FIG. 1 is a view showing a configuration of an image forming apparatus on which an electrophotographic photosensitive member according to an embodiment of the present disclosure is installed.
Figure 2:
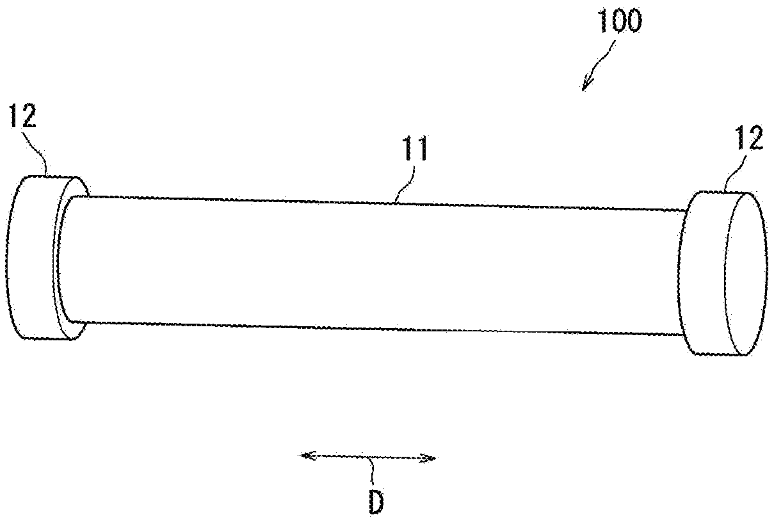
FIG. 2 is a perspective view showing electrophotographic drums according to the embodiment of the present disclosure.
Figure 3:
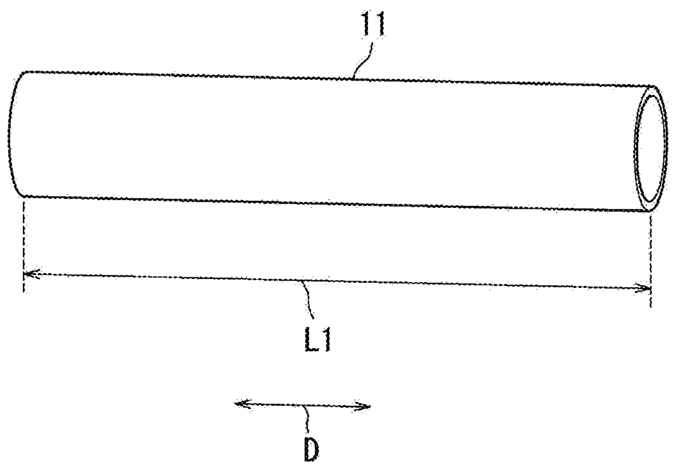
FIG. 3 is a perspective view showing the electrophotographic photosensitive member according to the embodiment of the present disclosure.

First of all, an image forming apparatus 1 will be described with reference to FIGS. 1 to 3. FIG. 1 is a view showing a configuration of the image forming apparatus 1 on which an electrophotographic photosensitive member 11 according to an embodiment of the present disclosure is installed. FIG. 2 is a perspective view showing photosensitive drums 10 according to the embodiment of the present disclosure. FIG. 3 is a perspective view showing an electrophotographic photosensitive member 11 according to the embodiment of the present disclosure.

The image forming apparatus 1 is, for example, an electrophotographic image forming apparatus. The image forming apparatus 1 forms an image on a sheet P with toner. As shown in FIG. 1, the image forming apparatus 1 includes a first toner container 2, a second toner container 3, a third toner container 4, and a fourth toner container 5. In this embodiment, the first toner container 2 stores yellow toner. The second toner container 3 stores cyan toner. The third toner container 4 stores magenta toner. The fourth toner container 5 stores black toner.

The image forming apparatus 1 includes, for example, the photosensitive drums 10, charging devices 20, an exposure device 30, developing devices 40, a transferring device 50, a cleaning device (not shown), an ionizing device (not shown), a fixation part 60, and a control unit 70.

The photosensitive drums 10 form electrostatic latent images on outer circumferential surfaces. As shown in FIG.

2, each of the photosensitive drums 10 includes the electrophotographic photosensitive member 11 and coupling portions 12.

The electrophotographic photosensitive member 11 includes a photosensitive layer on an outer circumferential surface. As shown in FIG. 3, the electrophotographic photosensitive member 11 is formed in a cylindrical shape. A length of the electrophotographic photosensitive member 11 in an axis line direction D is, for example, a length L1. The electrophotographic photosensitive member 11 is, for example, a selenium drum or organic photoconductor (OPC).

The coupling portions 12 couple the electrophotographic photosensitive member 11 to the image forming apparatus 1. Specifically, the coupling portions 12 are assembled in the image forming apparatus 1. As shown in FIG. 2, the coupling portions 12 are rotationally driven by a drive unit (not shown), such that the electrophotographic photosensitive member 11 is rotated around an axis line of the electrophotographic photosensitive member 11. The coupling portions 12 are attached to one end portion and the other end portion of the electrophotographic photosensitive member 11 in the axis line direction D.

As shown in FIG. 1, the charging devices 20 charge photosensitive layers of the photosensitive drums 10 to a predetermined potential. An example of the charging device 20 is a corona discharge device.

The exposure device 30 emits laser light to the photosensitive layers of the photosensitive drums 10 to be exposed to light. The exposure device 30 exposes the photosensitive layers of the photosensitive drums 10 to light on the basis of image data. As a result, an electrostatic latent image is formed on the photosensitive drums 10. An example of the exposure device 30 is a light emitting diode (LED).

The developing devices 40 accommodate a two-component developer including carrier and toner, which is made of a magnetic material, for example. Then, the developing devices 40 develop electrostatic latent images formed on the photosensitive drums 10 with the toner, such that toner images are formed on the photosensitive drums 10. A yellow toner image, a cyan toner image, a magenta toner image, and a black toner image are formed as toner images.

The transferring device 50 transfers each toner image formed on the surface of each photosensitive drum 10 to the sheet P. The transferring device 50 includes an intermediate transferring belt 51, primary transferring rollers 52, and a secondary transferring roller 53.

The primary transferring rollers 52 are respectively arranged to face the photosensitive drums 10 via the intermediate transferring belt 51 and are respectively pressed toward the photosensitive drums 10. Each of the photosensitive drums 10 rotates about the axis line via the coupling portions 12. Therefore, the toner image formed on the surface of each photosensitive drum 10 is transferred to the intermediate transferring belt 51 sequentially. A transferring nip is formed between the secondary transferring roller 53 and a driving roller 54. When the sheet P passes through the transferring nip, the toner image stacked on the intermediate transferring belt 51 is transferred to the sheet P. The sheet P to which the stacked toner image has been transferred is conveyed toward the fixation part 60 by a conveyance part 80.

The cleaning device removes the residual toner remaining on the photosensitive drums 10 after it is transferred. The ionizing device removes charges from the photosensitive drums 10.

The fixation part 60 heats and presses the toner image developed on the sheet P and fixes the toner image to the sheet P. The fixation part 60 includes, for example, a fixation roller 61, a heater (not shown), and a press roller 62.

The fixation roller 61 is a hollow roller having a cylindrical shape. The fixation roller 61 is press-fitted to the press roller 62. The press roller 62 and the fixation roller 61 form a nip part. The press roller 62 is rotationally driven by a drive unit (not shown). The press roller 62 rotates the fixation roller 61.

The heater is supplied with electric power from a power supply (not shown) and heats the fixation roller 61. The heater is arranged in proximity to an inner circumferential surface of the fixation roller 61. The sheet P conveyed to the fixation part is heated by the heater by passing through the nip part, and the toner images are fixed.

Figure 4:
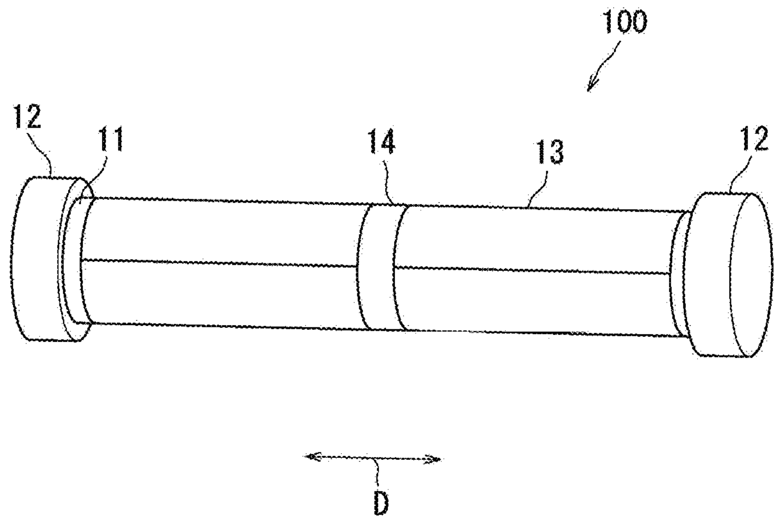
FIG. 4 is a perspective view showing a packaged object according to the embodiment of the present disclosure.
Figure 5:
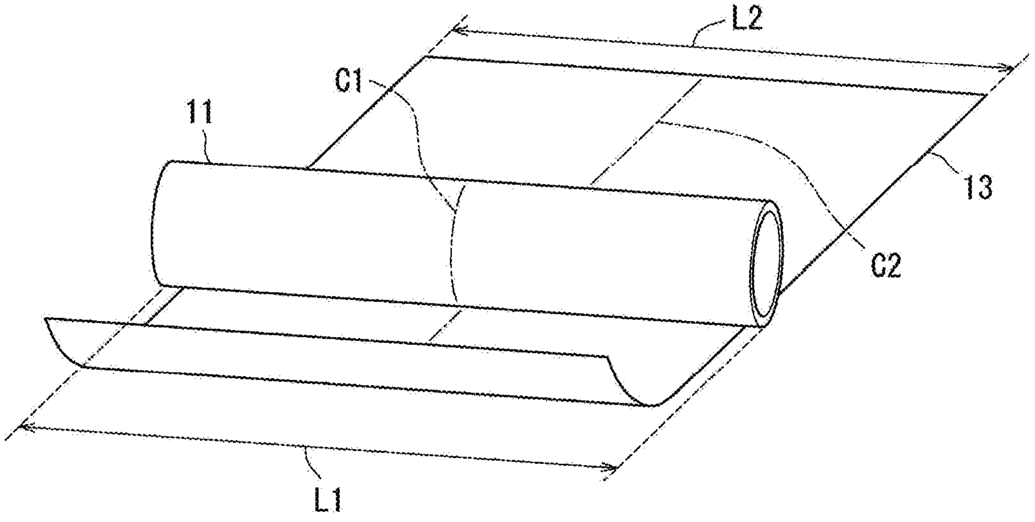
FIG. 5 is a perspective view showing a state of a protective sheet being wrapped around the electrophotographic photosensitive member.

Next, a packaged object 100 including the electrophotographic photosensitive member 11 will be described with reference to FIGS. 4 and 5. FIG. 4 is a perspective view showing the packaged object 100 according to the embodiment of the present disclosure. FIG. 5 is a perspective view showing a state of the protective sheet 13 being wrapped around the electrophotographic photosensitive member 11.

In the electrophotographic photosensitive member 11, a photosensitive layer including an inorganic or organic photoconductive matter is formed on an outer circumferential surface of a photoconductive substrate, such as an aluminum alloy. Therefore, the electrophotographic photosensitive member 11 is susceptible to pressure and contamination on the outer circumferential surface. In view of this, the electrophotographic photosensitive member 11 is handled as the packaged object 100 during storage or conveyance. As shown in FIG. 4, the packaged object 100 includes the electrophotographic photosensitive member 11, the coupling portions 12, and the protective sheet 13.

The protective sheet 13 covers at least a portion of the outer circumferential surface of the electrophotographic photosensitive member 11. The protective sheet 13 is formed in a substantially rectangular shape. As shown in FIG. 5, a center position C2 of the protective sheet 13 in the axis line direction D (see FIG. 4) is arranged overlapping a center position C1 of the electrophotographic photosensitive member 11 in an axis line direction D. Thus, the protective sheet 13 covers a central region of the electrophotographic photosensitive member 11 in the axis line direction D.

A length of a side of the protective sheet 13 along a direction orthogonal to the axis line direction D is equal to or larger than a length of an outer periphery of the electrophotographic photosensitive member 11. Provided that a length of a side along the axis line direction D of the electrophotographic photosensitive member 11 is denoted by L1 (mm) and a length of a side along the axis line direction D of the protective sheet 13 is denoted by L2 (mm), a relationship expressed by Expression (1) below is established:

$$L2 < L1. \tag{1}$$

Accordingly, damage of the electrophotographic photosensitive member 11 can be suppressed. Specifically, in a case where the coupling portions 12 are attached to the electrophotographic photosensitive member 11, end portions of the protective sheet 13 are separated from the coupling portions 12, so the end portions of the protective sheet 13 are prevented from being in contact with the coupling portions 12 during the conveyance. In a case where the coupling portions 12 are detached from the electrophotographic photosensitive member 11, the end portions of the protective sheet 13 are separated from wall portions of the container that accommodates the packaged object 100, so the end portions of the protective sheet 13 are prevented from being in contact with the container during the conveyance. Therefore, the end portions of the protective sheet 13 can be prevented from bending during the conveyance. That is, the end portions of the protective sheet 13 can be prevented from being in contact with the photosensitive layer of the electrophotographic photosensitive member 11.

Here, the electrophotographic photosensitive member packaged by the protective sheet is accommodated in an accommodation container and is conveyed as a package member. During the conveyance of the package member, the end portions of the protective sheet may come into contact with the accommodation container and be bent. In a case where an end portion of the protective sheet is bent inwards, the bent portion may damage the photosensitive layer of the electrophotographic photosensitive member packaged with the protective sheet. In a case where an end portion of the protective sheet is bent outwards, the bent portion may damage the photosensitive layer of the adjacent electrophotographic photosensitive member. In contrast, in accordance with the packaged object 100, damage of the electrophotographic photosensitive member can be suppressed.

Black light-shielding paper, an opaque synthetic resin film, a synthetic resin-coated film of high-quality paper, opaque kraft paper with a pressed surface, or the like can be applied to the protective sheet 13. In particular, the black light-shielding paper is favorable. The black light-shielding paper can suppress the deterioration of the electrophotographic photosensitive member 11. Specifically, the black light-shielding paper improves the photoconductivity of the protective sheet 13. Thus, the black light-shielding paper can suppress the generation of static electricity in the protective sheet 13 and can suppress the deterioration of the electrophotographic photosensitive member 11 due to static electricity.

As shown in FIG. 4, the packaged object 100 has an adhesive tape 14. The adhesive tape 14 fixes, in a central portion of the protective sheet 13 in the axis line direction D, the end portions of the protective sheet 13 in the circumferential direction, which is wrapped around the electrophotographic photosensitive member 11, to a middle portion of the protective sheet 13. Accordingly, the protective sheet 13 can be fixed through a small amount of adhesive tape 14. Note that the adhesive tape 14 may be arranged in a position other then the central portion of the protective sheet 13 in the axis line direction D. Moreover, the adhesive tape 14 may be an entire region of the protective sheet 13 in the circumferential direction or may be a portion thereof.

In order to further prevent the end portions of the protective sheet 13 from bending during the conveyance, a relationship expressed by Expression (2) below is favorably met:

$$0.0300 \leq (L1 - L2)/L1. \quad (2)$$

Accordingly, damage of the electrophotographic photosensitive member 11 can be further suppressed.

The photosensitive drum 10 is a consumable part. The photosensitive drum 10 is accommodated in the container and conveyed in the state of the packaged object 100. A serviceman holds the packaged object 100 and performs a replacement task during replacement of the photosensitive drum 10. To enhance the accommodation workability of the packaged object 100 and the replacement workability of the photosensitive drum 10, a relationship expressed by Expression (3) below is favorably met:

$$100 < L2. \quad (3)$$

Accordingly, the manufacturability can be enhanced. Here, the manufacturability includes the accommodation workability of the packaged object 100 to the image forming apparatus 1 and the replacement workability of the photosensitive drum 10.

EXAMPLES

Figure 6:
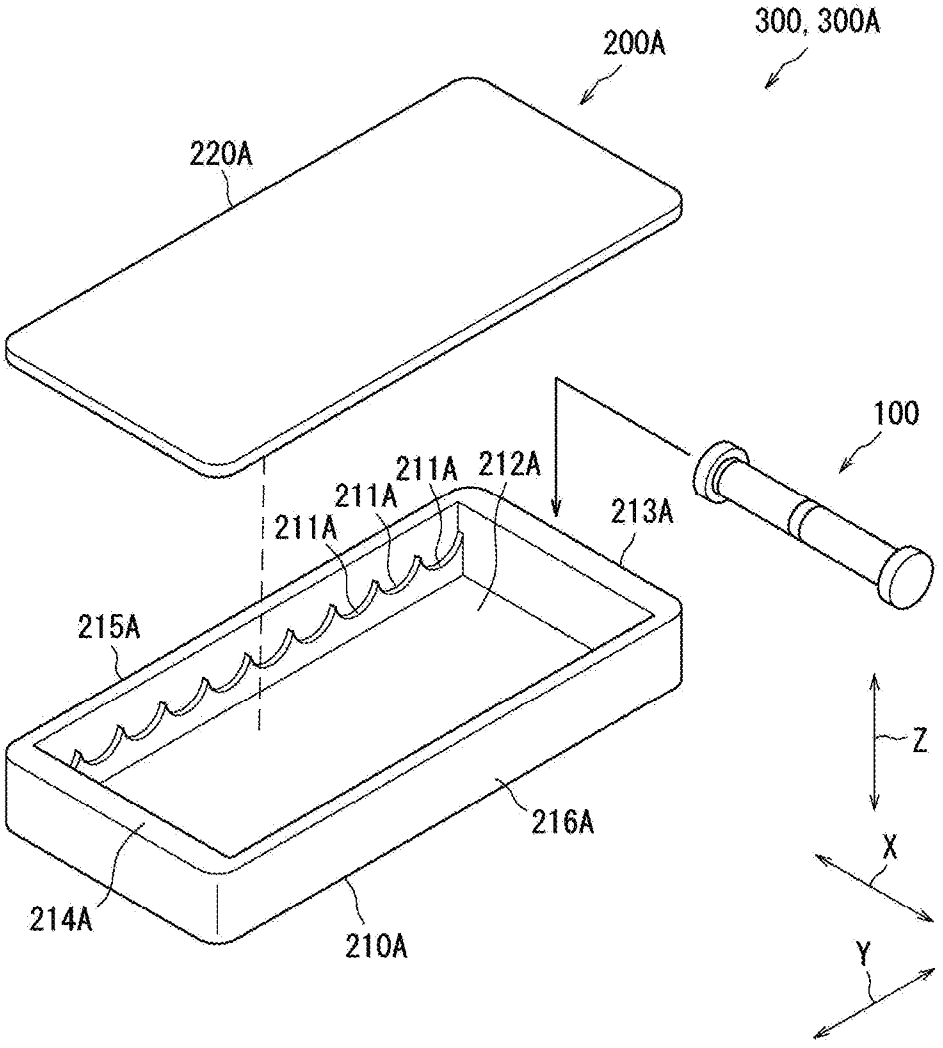
FIG. 6 is a schematic configuration view showing an example of a package member.
Figure 7:
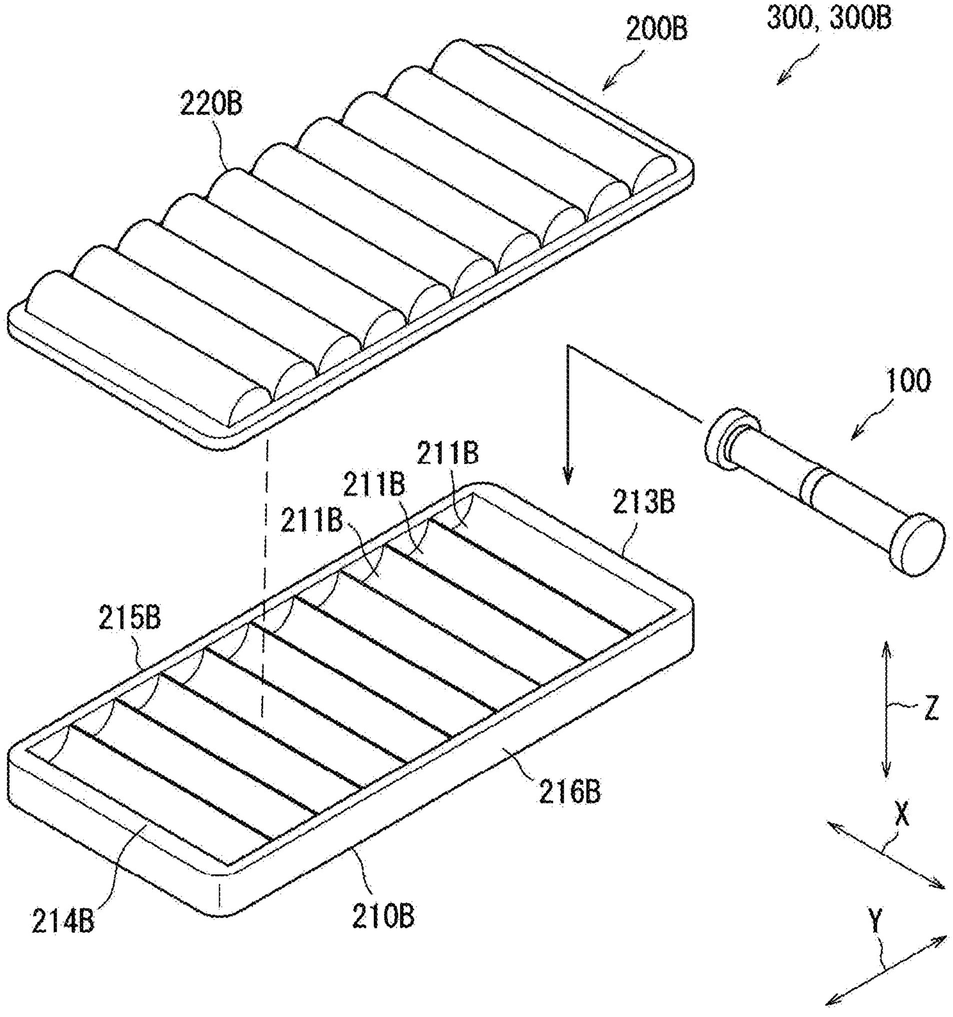
FIG. 7 is a schematic configuration view showing an example of another package member.

The present disclosure will be described more specifically with reference to FIGS. 6 and 7. FIG. 6 is a schematic configuration view showing an example of a package member 300A. FIG. 7 is a schematic configuration view showing an example of another package member 300B. Hereinafter, Examples 1 to 20 and Comparative Examples 1 and 2 will be described.

Example 1

As shown in FIG. 3, an electrophotographic photosensitive member 11, which was an organic photosensitive member with a length L1 of 245 mm in the axis line direction D and an outer shape of 30.2 mm, was prepared. As shown in FIG. 5, a protective sheet 13, which was rectangular black paper with a length L2 of 236 mm in the axis line direction D (see FIG. 3), a length of 150 mm in the direction orthogonal to the axis line direction D, and paper density of 80 g/m$^2$, was prepared. A center position C2 of the protective sheet 13 in the axis line direction D was aligned with a center position C1 of the electrophotographic photosensitive member 11 in an axis line direction D and the protective sheet 13 was wrapped around the electrophotographic photosensitive member 11 without loosening. An adhesive tape 14 (see FIG. 4) with a size of 1 cm×6 cm was bonded to the central portion of the protective sheet 13 in the axis line direction D and the protective sheet 13 was fixed to the electrophotographic photosensitive member 11. As shown in FIG. 4, coupling portions 12 were attached to one end portion and the other end portion of the electrophotographic photosensitive member 11 in the axis line direction D and a packaged object 100 according to Example 1 was obtained. The packaged object 100 is conveyed in the state of the package member 300A.

As shown in FIG. 6, the package member 300A includes the packaged object 100 and an accommodation container 200A. Hereinafter, the description will be given assuming that when the packaged object 100 is accommodated in the accommodation container 200A, a direction of the packaged object 100 along the axis line direction D (see FIG. 4) is a left-right direction X, a direction parallel to the horizontal direction and orthogonal to the left-right direction X is a front-back direction Y, and a direction orthogonal to the left-right direction X and the front-back direction Y is an up-down direction Z.

The accommodation container 200A accommodates a plurality of packaged objects 100. The accommodation container 200A is configured to have a substantially rectangular parallelepiped shape. The accommodation container 200A is made of, for example, polyethylene terephthalate resin (PET) and accommodates ten packaged objects 100. Accordingly, the accommodation container 200A ensures cold resistance, water resistance, and electrical insulation. The accommodation container 200A includes a container part 210A and a lid part 220A.

The container part 210A accommodates the entire plurality of packaged objects 100 along the front-back direction Y. Specifically, the container part 210A accommodates the entire plurality of packaged objects 100 so that the plurality of packaged objects 100 is aligned in parallel. The container part 210A includes support portions 211A, a bottom wall 212A, a front wall 213A, a rear wall 214A, a left wall 215A, and a right wall 216A. Shorter walls of the front, rear, left, and right walls will be sometimes described as the front wall 213A and the rear wall 214A. A wall on the left side when facing the rear wall 214A will be sometimes described as the left wall 215A.

The bottom wall 212A is a substantially rectangular wall portion that faces the lid part 220A and is orthogonal to the up-down direction Z. The front wall 213A extends upwards from one end portion of the bottom wall 212A in the front-back direction Y and is orthogonal to the front-back direction Y. The rear wall 214A extends upwards from the other end portion of the bottom wall 212A in the front-back direction Y and faces the front wall 213A. The left wall 215A extends upwards from one end portion of the bottom wall 212A in the left-right direction X and is orthogonal to the left-right direction X. The right wall 216A extends upwards from the other end portion of the bottom wall 212A in the left-right direction X and faces the left wall 215A.

The support portions 211A support end portions of the packaged object 100 in the left-right direction X. The left support portions 211A are arranged on a side of the left wall 215A, which faces the right wall 216A, and the right support portions 211A are arranged on a side of the right wall 216A, which faces the left wall 215A. The left support portions 211A and the right support portions 211A respectively support one coupling portion 12 and the other coupling portion 12 of the packaged object 100. Accordingly, the end portions of the protective sheet 13 can be prevented from bending in the package member 300A that accommodates the plurality of packaged objects 100.

The left support portions 211A have upper surface portions that are substantially arcuate in cross-section. The upper surface portions are capable of being held in face contact with the lower portions of the coupling portions 12. The left support portions 211A project toward the right wall 216A from the left wall 215A. The length of the left support portions 211A in the left-right direction X that protrude toward the right wall 216A is shorter than the length of the coupling portions 12 in the left-right direction X. Accordingly, the end portions of the protective sheet 13 can be further prevented from bending. The right support portions 211A are similar to the left support portions 211A.

The lid part 220A closes the opening of the container part 210A. The plate-shaped lid part 220A closes the opening of the container part 210A in which the ten packaged objects 100 according to Example 1 are accommodated. A package member 300A according to Example 1 was thus obtained.

Example 2

In Example 2, a package member 300A with similar settings to those in Example 1 was obtained, except that the length L2 of the protective sheet 13 in the axis line direction D was changed to 236 mm to 234 mm.

Example 3

In Example 3, a package member 300A with similar settings to those in Example 1 was obtained, except that the length L2 of the protective sheet 13 in the axis line direction D was changed to 236 mm to 232 mm.

Example 4

In Example 4, a package member 300A with similar settings to those in Example 1 was obtained, except that the length L2 of the protective sheet 13 in the axis line direction D was changed to 236 mm to 230 mm.

Example 5

In Example 5, a package member 300A with similar settings to those in Example 1 was obtained, except that the length L2 of the protective sheet 13 in the axis line direction D was changed to 236 mm to 200 mm.

Example 6

In Example 6, a package member 300A with similar settings to those in Example 1 was obtained, except that the length L2 of the protective sheet 13 in the axis line direction D was changed to 236 mm to 150 mm.

Example 7

In Example 7, a package member 300A with similar settings to those in Example 1 was obtained, except that the length L2 of the protective sheet 13 in the axis line direction D was changed to 236 mm to 125 mm.

Example 8

As shown in FIG. 3, an electrophotographic photosensitive member 11, which was an organic photosensitive member with a length L1 of 343 mm in the axis line direction D and an outer shape of 30.2 mm, was prepared. As shown in FIG. 5, a protective sheet 13, which was rectangular black paper with a length L2 of 332 mm in the axis line direction D (see FIG. 3), a length of 150 mm in the direction orthogonal to the axis line direction D, and paper density of 80 g/m$^2$, was prepared. A center position C2 of the protective sheet 13 in the axis line direction D was aligned with a center position C1 of the electrophotographic photosensitive member 11 in the axis line direction D and the protective sheet 13 was wrapped around the electrophotographic photosensitive member 11 without loosening. An adhesive tape 14 (see FIG. 4) with a size of 1 cm×6 cm was bonded to the central portion of the protective sheet 13 in the axis line direction D and the protective sheet 13 was fixed to the electrophotographic photosensitive member 11. As shown in FIG. 4, coupling portions 12 were attached to one end portion and the other end portion of the electrophotographic photosensitive member 11 in the axis line direction D and the packaged object 100 according to Example 8 was obtained. The packaged object 100 is conveyed in the state of the package member 300B. Hereinafter, when the package member 300A and the package member 300B may be collectively referred to as package members 300.

As shown in FIG. 7, the package member 300B includes the packaged object 100 and an accommodation container 200B.

The accommodation container 200B accommodates the plurality of packaged objects 100. The accommodation container 200B is made of, for example, polypropylene resin (PP) and accommodates ten packaged objects 100. Accordingly, even though the accommodation container 200B is inexpensive, the accommodation container 200B ensures heat resistance and chemical resistance. The accommodation container 200B includes a container part 210B and a lid part 220B.

The container part 210B accommodates lower halves of the plurality of packaged objects 100. Specifically, the container part 210B accommodates the lower halves of the plurality of packaged objects 100 so that the plurality of packaged objects 100 is aligned in parallel in the front-back direction Y. The container part 210B includes support portions 211B, a front wall 213B, a rear wall 214B, a left wall 215B, and a right wall 216B.

The support portions 211B support end portions of the packaged objects 100 in the left-right direction X. The support portions 211B are configured to have wavy cross-sections. The support portions 211B have upper surface portions that are substantially arcuate in cross-section. The upper surface portions are capable of being held in face contact with the lower portions of the coupling portions 12.

The front wall 213B extends upwards from one end portions of the support portions 211B in the front-back direction Y. The front wall 213B is orthogonal to the front-back direction Y. The rear wall 214B extends upwards from the other end portions of the support portions 211B in the front-back direction Y. The rear wall 214B faces the front wall 213B. The left wall 215B extends upwards from one end portions of the support portions 211B in the left-right direction X. The left wall 215B is orthogonal to the left-right direction X. The right wall 216B extends upwards from the other end portions of the support portions 211B in the left-right direction X. The right wall 216B faces the left wall 215B.

The lid part 220B accommodates upper halves of the plurality of packaged objects 100. Specifically, the lid part 220B accommodates the upper halves of the plurality of packaged objects 100 so that the plurality of packaged objects 100 is aligned in parallel toward the front-back direction Y. By aligning the container part 210B with the lid part 220B, the accommodation container 200B accommodates the plurality of packaged objects 100. A package member 300B according to Example 8 was thus obtained.

Example 9

In Example 9, a package member 300B with settings similar to those of Example 8 was obtained, except that the length L2 of the protective sheet 13 in the axis line direction D was changed to 332 mm to 330 mm.

Example 10

In Example 10, a package member 300B with settings similar to those of Example 8 was obtained, except that the length L2 of the protective sheet 13 in the axis line direction D was changed to 332 mm to 328 mm.

Example 11

In Example 11, a package member 300B with settings similar to those of Example 8 was obtained, except that the length L2 of the protective sheet 13 in the axis line direction D was changed to 332 mm to 326 mm.

Example 12

In Example 12, a package member 300B with settings similar to those of Example 8 was obtained, except that the length L2 of the protective sheet 13 in the axis line direction D was changed to 332 mm to 300 mm.

Example 13

In Example 13, a package member 300B with settings similar to those of Example 8 was obtained, except that the length L2 of the protective sheet 13 in the axis line direction D was changed to 332 mm to 250 mm.

Example 14

In Example 14, a package member 300B with settings similar to those of Example 8 was obtained, except that the length L2 of the protective sheet 13 in the axis line direction D was changed to 332 mm to 175 mm.

Example 15

In Example 15, a package member 300A with similar settings to those in Example 1 was obtained, except that the length L2 of the protective sheet 13 in the axis line direction D was changed to 236 mm to 238 mm.

Example 16

In Example 16, a package member 300A with similar settings to those in Example 1 was obtained, except that the length L2 of the protective sheet 13 in the axis line direction D was changed to 236 mm to 50 mm.

Example 17

In Example 17, a package member 300A with similar settings to those in Example 1 was obtained, except that the length L2 of the protective sheet 13 in the axis line direction D was changed to 236 mm to 100 mm.

Example 18

In Example 18, a package member 300B with settings similar to those of Example 8 was obtained, except that the length L2 of the protective sheet 13 in the axis line direction D was changed to 332 mm to 335 mm.

Example 19

In Example 19, a package member 300B with settings similar to those of Example 8 was obtained, except that the length L2 of the protective sheet 13 in the axis line direction D was changed to 332 mm to 50 mm.

Example 20

In Example 20, a package member 300B with settings similar to those of Example 8 was obtained, except that the length L2 of the protective sheet 13 in the axis line direction D was changed to 332 mm to 100 mm.

Comparative Example 1

In Comparative Example 1, a package member 300A with similar settings to those in Example 1 was obtained, except that the length L2 of the protective sheet 13 in the axis line direction D was changed to 236 mm to 245 mm.

Comparative Example 2

In Comparative Example 2, a package member 300B with settings similar to those of Example 8 was obtained, except that the length L2 of the protective sheet 13 in the axis line direction D was changed to 332 mm to 343 mm.

[Light-Shielding Paper Edge Evaluation]

Under the conditions of frequency: 5 Hz to 100 Hz, sweep time: 1-minute sweep, and vibration acceleration: 1G, using a sine wave sweep vibration test apparatus, each of the package members 300 according to Examples 1 to 20 and Comparative Examples 1 and 2 was vibrated for 30 minutes in each of the left-right direction X, the front-back direction Y, and the up-down direction Z after the package member 300 was fixed to the vibration test apparatus. Then, the end portions of the protective sheets 13 of all the ten packaged objects 100 were observed, the number of folds of the light-shielding paper edges was checked, and light-shielding paper edges were evaluated on the basis of the references below. The obtained results and evaluation are shown in Table 1.

A: No folds of the light-shielding paper edges occurs.

B: The percentage of folds of the light-shielding paper edges is 2 or less of 10.

C: The percentage of folds of the light-shielding paper edges is 3 or more of 10.

[Manufacturability Evaluation]

Each of the packaged objects 100 according to Examples 1 to 20 and Comparative Examples 1 and 2 was taken out of the package member 300, and whether or not it was possible to assemble the packaged object 100 in the image forming apparatus 1 without contact with the photosensitive layer of the surface of the electrophotographic photosensitive member 11 was tested. The conditions were that the portion wrapped around the protective sheet 13 was held from the outer surface and the packaged object 100 was stably supported when the packaged object 100 was taken out of the package member 300. Based on the references below, the manufacturability evaluation was conducted. The obtained results and evaluation are shown in Table 1.

A: The serviceman's hands do not touch the surface of the electrophotographic photosensitive member 11 during the assembling.

B: The serviceman's hands touch the surface of the electrophotographic photosensitive member 11 during the assembling.

TABLE 1

| | Substrate length (L1) [mm] | Protective sheet length (L2) [mm] | (L1 − L2)/L1 | Light-shielding paper edge evaluation Number of rolls | Light-shielding paper edge evaluation Result | Manufacturability evaluation Result |
|---|---|---|---|---|---|---|
| Example 1 | 245 | 236 | 0.0367 | 0 | A | A |
| Example 2 | 245 | 234 | 0.0449 | 0 | A | A |
| Example 3 | 245 | 232 | 0.0531 | 0 | A | A |
| Example 4 | 245 | 230 | 0.0612 | 0 | A | A |
| Example 5 | 245 | 200 | 0.1837 | 0 | A | A |
| Example 6 | 245 | 150 | 0.3878 | 0 | A | A |
| Example 7 | 245 | 125 | 0.4898 | 0 | A | A |
| Example 8 | 343 | 332 | 0.0321 | 0 | A | A |
| Example 9 | 343 | 330 | 0.0379 | 0 | A | A |
| Example 10 | 343 | 328 | 0.0437 | 0 | A | A |
| Example 11 | 343 | 326 | 0.0496 | 0 | A | A |
| Example 12 | 343 | 300 | 0.1254 | 0 | A | A |
| Example 13 | 343 | 250 | 0.2711 | 0 | A | A |
| Example 14 | 343 | 175 | 0.4898 | 0 | A | A |
| Example 15 | 245 | 238 | 0.0286 | 2 | B | A |
| Example 16 | 245 | 50 | 0.7959 | 0 | A | C |
| Example 17 | 245 | 100 | 0.5918 | 0 | A | C |
| Example 18 | 343 | 335 | 0.0233 | 1 | B | A |
| Example 19 | 343 | 50 | 0.8542 | 0 | A | C |
| Example 20 | 343 | 100 | 0.7085 | 0 | A | C |
| Comparative Example 1 | 245 | 245 | 0.0000 | 9 | C | A |
| Comparative Example 2 | 343 | 343 | 0.0000 | 6 | C | A |

As shown in Table 1, with the packaged objects 100 according to Examples 1 to 20, i.e., the packaged objects 100 meeting Expression (1), no folds of the light-shielding paper edges or only 2 or less of 10 were generated. With the packaged object 100 not meeting Expression (1), folds of the light-shielding paper edges were generated in more than 50% of the cases. With the packaged object 100 meeting Expression (2), no folds of the light-shielding paper edges were generated. With the packaged object 100 meeting Expression (3), the contact with the surface of the electrophotographic photosensitive member 11 occurred when the packaged object 100 were assembled in the image forming apparatus 1. Thus, in accordance with the present disclosure, damage of the electrophotographic photosensitive member 11 can be suppressed.

Hereinabove, the embodiment of the present disclosure has been described with reference to the drawings. Note that the present disclosure is not limited to the above-mentioned embodiment, and may be carried out in various aspects without departing from the gist. For easy understanding, the drawings each schematically show configurations of elements mainly, and the thickness, the length, the number of items, and the like of each component shown in the figure are different from the actual ones for the sake of convenience for creating the drawings. Moreover, the material, the shape, the dimensions, and the like of each component shown in the above-mentioned embodiment, and there are no particular limitations and various modifications can be made without substantially departing from the effects of the present disclosure.

(1) As described with reference to FIGS. 1 to 7, in this embodiment, the packaged object 100 includes the electrophotographic photosensitive member 11, the pair of coupling portions 12, and the protective sheet 13, though the present disclosure is not limited thereto. The pair of coupling portions 12 can be omitted and the packaged object 100 can provide similar effects even in an aspect in which the packaged object 100 includes the electrophotographic photosensitive member 11 and the protective sheet 13. In this case, the length of the left support portions 211A in the left-right direction X is set to be shorter than a separation distance between the left end portion of the electrophotographic photosensitive member 11 and the left end portion of the protective sheet 13. That is, the electrophotographic photosensitive member 11 is placed on the upper surface portions of the support portion 211A.

(2) In this embodiment, the ten packaged objects 100 are accommodated in the single package member 300, though the present disclosure is not limited thereto. The package member 300 only needs to accommodate at least two packaged objects 100 and may accommodate eleven or more packaged objects 100.

(3) In this embodiment, the protective sheet 13 is fixed through the single adhesive tape 14 after the protective sheet 13 is wrapped around the electrophotographic photosensitive member 11, though the present disclosure is not limited thereto. The adhesive tape 14 may be provided at two or more positions. Moreover, the adhesive tape 14 may be provided in the entire outer peripheral region of the protective sheet 13 or may be provided in a part of the outer periphery of the protective sheet 13.

It should be understood by those skilled in the art that various modifications, combinations, sub-combinations and alterations may occur depending on design requirements and other factors insofar as they are within the scope of the appended claims or the equivalents thereof.

What is claimed is:

1. A package member, comprising:

a plurality of packaged objects wherein each of the packaged objects comprises an electrophotographic photosensitive member formed in a cylindrical shape; and a protective sheet that covers at least a portion of an outer circumferential surface of the electrophotographic photosensitive member so that a center position in an axis line direction is aligned with a center position of the electrophotographic photosensitive member in the axis line direction, wherein provided that a length of the electrophotographic photosensitive member in the axis line direction is set to L1 (mm) and a length of the protective sheet in the axis line direction is set to L2 (mm), a relationship expressed by Expression (1) below is established $$L2 < L1, \tag{1}$$

and a relationship expressed by Expression (2) below is established $$0.0300 \leq (L1 - L2)/L1; \tag{2}$$

and an accommodation container that accommodates the plurality of packaged objects so that the plurality of packaged objects are aligned in parallel, wherein each of the packaged objects includes, at an end portion of each of the packaged objects in an axis line direction, a coupling portion capable of being assembled in an image forming apparatus, the accommodation container includes a support portion that supports end portions of the plurality of packaged objects in the axis line direction, and the support portion supports the coupling portion.

2. The package member according to claim 1, wherein the accommodation container is polyethylene terephthalate resin or polypropylene resin.

3. The package member according to claim 1, wherein, for each of the packaged objects, a relationship expressed by Expression (3) below is established:

$$100 < L2. \tag{3}$$

4. The package member according to claim 1, wherein the protective sheet is black light-shielding paper.

5. The package member according to claim 1, wherein a length of the support portion in the axis line direction is shorter than a length of the coupling portion in the axis line direction.

* * * * *